United States Patent [19]

Baldwin et al.

[11] Patent Number: 4,778,996

[45] Date of Patent: Oct. 18, 1988

[54] CEILING MOUNTED PASSIVE INFRARED INTRUSION DETECTOR WITH PYRAMIDAL MIRROR

[75] Inventors: John Baldwin, Danbury; William Kahl, Brookfield, both of Conn.

[73] Assignee: Cerberus AG, Switzerland

[21] Appl. No.: 905,167

[22] Filed: Sep. 8, 1986

[51] Int. Cl.[4] .................................................. G01J 5/08

[52] U.S. Cl. ...................................... 250/353; 250/342

[58] Field of Search ............................. 250/342, 353, ; 340/567, 600; 350/452

[56] References Cited

U.S. PATENT DOCUMENTS

| | | | |
|---|---|---|---|
| 3,551,676 | 12/1970 | Runnels | 250/353 |
| 4,271,359 | 6/1981 | Herwig et al. | 250/347 |
| 4,275,303 | 6/1981 | Mudge | 250/342 |
| 4,321,594 | 3/1982 | Galvin et al. | 340/567 |
| 4,447,726 | 5/1984 | Mudge et al. | 250/342 |
| 4,451,734 | 5/1984 | St. Jean et al. | 250/342 |
| 4,484,075 | 11/1984 | Kahl et al. | 250/342 |
| 4,510,488 | 4/1985 | St. Jean et al. | 340/567 |
| 4,672,206 | 6/1987 | Suzuki et al. | 250/342 |

*Primary Examiner*—Janice A. Howell
*Assistant Examiner*—Constantine Hannaher
*Attorney, Agent, or Firm*—Brumbaugh, Graves, Donohue & Raymond

[57] ABSTRACT

A ceiling mounted passive infrared detector has an enclosure arranged for mounting to ceiling, a downwardly pointing infrared detecting element within the enclosure, a first multifaceted pyramidal mirror having an apex pointing upwardly toward the detecting element and a plurality of focusing lenses, one for each facet of the mirror and mounted between the base of the pyramidal mirror and the periphery of the enclosure to focus infrared radiation onto the detecting element directly and via reflection in the pyramidal mirror. A further embodiment includes the enclosure wherein the lenses are disposed on the plane immediately above the apex of the mirror so that radiation will be reflected off the mirror and refracted by the lenses onto the detecting element.

7 Claims, 2 Drawing Sheets

CEILING MOUNTED PASSIVE INFRARED INTRUSION DETECTOR WITH PYRAMIDAL MIRROR

BACKGROUND OF THE INVENTION

The present invention relates to passive infrared intrusion detectors, and more particularly to an infrared intrusion detector which is arranged for mounting on a ceiling.

In U.S. Pat. No. 4,275,303, which is assigned to the same assignee as the present invention, there is disclosed a passive infrared intrusion detector. The system includes an infrared sensing element within an enclosure and a lens covering an opening of the enclosure. Infrared radiation from an intruder is focused onto the sensing element to cause the system to indicate the presence of an intruder in a protected area. The system also includes a light within the enclosure which can radiate visible light in a direction which indicates the zone of infrared sensitivity.

In intrusion systems of the above type, the detector is generally mounted to a wall of the room or area to be protected so that the sensing element of the detector receives infrared radiation from an intruder on one or more beams of infrared sensitivity extending outward from the detector.

Accordingly, one problem with the prior art detecting devices is that, since they are mounted on a wall, an intruder might have access to the device so that he can tamper with it to prevent actuation of the alarm. Further, the device may be unable to observe an intruder close to the wall. Therefore, it is desirable to place the detector in a location such as the ceiling where it is difficult for an intruder to reach it to affect its operation and from which the entire area can be observed. The optical arrangements of the prior art detectors are such that ceiling mounting of the device does not provide for an adequate field of vision to protect the premises.

Accordingly, it is an object of the present invention to provide a passive infrared detector which is arranged to be mounted on a ceiling.

It is a further object of the invention to provide an infrared detector which has a beam indicating light.

SUMMARY OF THE INVENTION

Pursuant to these objects, and other which become apparent hereafter, there is provided an infrared intrusion detector for mounting on a ceiling. The detector includes an enclosure with a downwardly pointing infrared sensing element mounted therein. The lower end of the enclosure is tapered to have a hexagonal shape which meets with a multifaceted lens which includes segments arranged in azimuth around the periphery at the lower end of the enclosure. A first multifaceted pyramidal mirror is provided so that its apex points upwardly towards the detecting element and its base, with a periphery spaced from the lower end of the enclosure, forms a first multifaceted aperture. The lens segments focus the infrared radiation onto the sensing element via reflection in the pyramidal mirror, and may also be arranged to focus infrared radiation directly onto the sensing element without reflecting off the mirror.

As a further embodiment, the lower end of the enclosure is tapered to have a hexagonal shape to meet with a window of infrared translucent plastic, or the like, while the multifaceted lens is mounted to lie above the apex of a pyramidal mirror. In this manner, infrared radiation, after passing through the plastic, reflects off the pyramidal mirror to the central lens segment of the multifaceted lens, which focuses the infrared radiation onto the sensing element. Additionally, infrared radiation is focused by the peripheral lens segments directly onto the sensing element without reflecting off the pyramidal mirror.

In a preferred embodiment of the invention the first pyramidal mirror is hollow, and the device further includes a light source located within the first pyramidal mirror. A second multifaced pyramidal mirror is mounted within the first pyramidal mirror and has the same number of reflective surfaces with similar angular orientation as the first pyramidal mirror. The second pyramidal mirror is spaced from the first mirror so as to form a second multifaceted aperture. A plurality of focusing lenses are provided in the second multifaceted aperture for focusing light from the light source parallel to the radiation focused onto the detector by the lenses in the first aperture.

As a result of the cooperation between the first and second pyramidal mirrors, along with the focusing lens, a passive infrared intrusion detecting device is provided which is suitable for mounting on a ceiling in that it has a large field of vision for the detection of intruders.

The novel features which are considered as characteristic for the invention are supported in particular in the appending claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
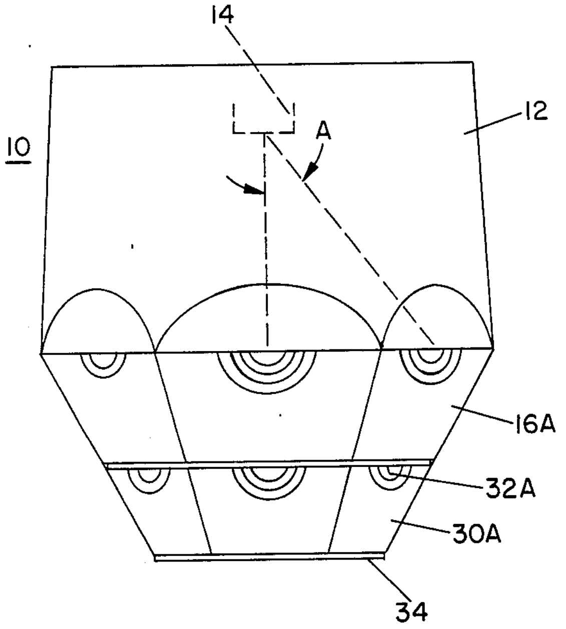
FIG. 1 is a side view of a ceiling mounted passive infrared intrusion detector according to the present invention.

Referring to FIGS. 1 through 4 there is shown a passive infrared intrusion detector 10 arranged for ceiling mounting and constructed in accordance with the present invention. The detector 10 includes a housing 12 which encloses an infrared sensing element 14. The housing 12 is generally cylindrical in shape and has an upper surface which is flat for mounting against a ceiling or the like. The lower end of housing 12 is tapered to have a hexagonal shape which meets with a multifaced lens 16 which includes lens segments 16A through 16F arranged in azimuth around the periphery at the lower end of the housing 12.

Figure 3:
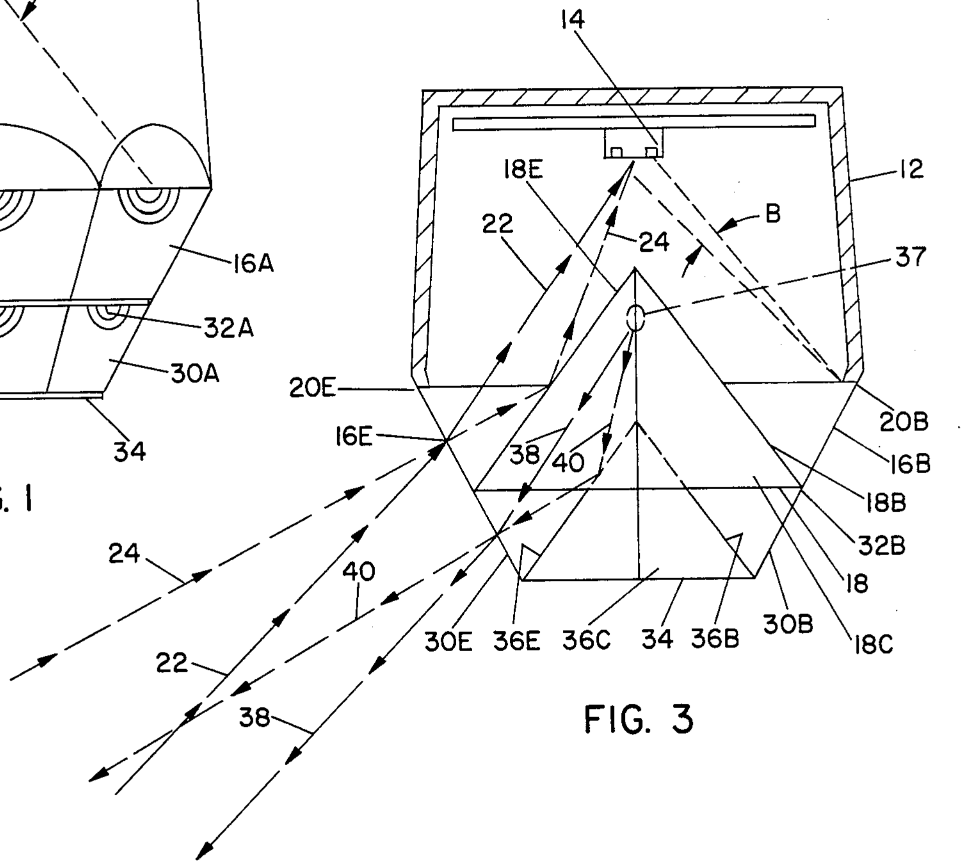
FIG. 3 is a side cross-sectional view showing the orientation of the pyramidal mirrors in the detecting device.
Figure 2:
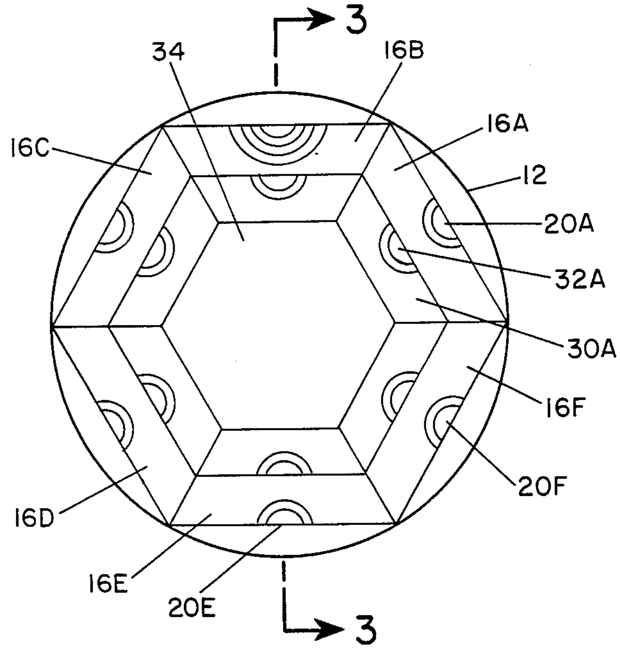
FIG. 2 is a bottom view of the device in FIG. 1.
Figure 4:
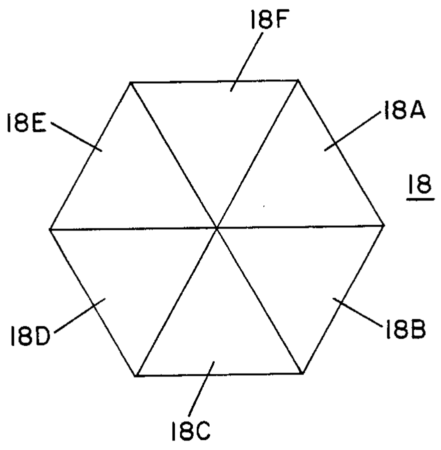
FIG. 4 is a top view of a pyramidal mirror used in the FIG. 1 detector.

Referring to FIG. 3, which shows a cross section of detector 10 taken along lines indicated in FIG. 2, it may be seen that on the interior of housing 12 there is provided a pyramidal mirror 18, a top view of which is shown in FIG. 4. In the illustrated embodiment multifaceted lens 16 and pyramidal mirror 18 each have six optical sides. It will be recognized by those skilled in the art that the pyramidal mirror and multifaceted lens may have 8, 10, 12 or 16 sides according to the number of desired beams of infrared sensitivity in azimuth with respect to the detector. For simplicity of illustration the unit shown has only six sides to the multifaced lens 16 and pyramidal mirror 18.

Referring again to the cross-sectional view shown in FIG. 3, the operation of the optical arrangement of the ceiling mounted passive infrared detector 10 is illustrated. Infrared energy incident on the detector along a path 24 is refracted by lens segment 20E and reflected by segment 18E of pyramidal mirror 18 in a focused condition onto infrared sensing element 14. This provides one of the beams of infrared sensitivity for the detector. Incident direction 24 may be arranged, for example, to have an angle of approximately 60° from vertical. Since pyramidal mirror 18 and multifaceted lens 16 have six sides in the illustrated embodiment, there are provided six beams of infrared sensitivity equally spaced in azimuth and having an elevation angle of 60° from vertical. In addition, infrared energy incident along path 22 is refracted by lens segment 20E and radiates directly into infrared sensing element 14. This angle of incidence of infrared energy has an optical axis of approximately 45° from vertical, and since there are six lens segments in multifaceted lens 20, six such beams are equally spaced in azimuth. Accordingly, the arrangement shown provides a total of twelve beams at two locations of elevation and all spaced equally in azimuth around the ceiling mounted detector.

Those skilled in the art will recognize that by providing a pyramidal mirror with additional or fewer reflecting surfaces, and providing a similar number of lens segments for lens 16 it is possible to have a greater or lesser number of beams in azimuth provided to the infrared sensing element 14.

In the embodiment illustrated, there is further provided a second pyramidal mirror 36 which is arranged below and partially within the first pyramidal mirror 18 which is hollow for this purpose. Within pyramidal mirror 18 there is arranged a light emitting diode 37, which can be selectively activated for purposes of indicating the alignment of the beams of infrared sensitivity of the detector 10. Between the base 34 of second pyramidal mirror 36 and the base of the first pyramidal mirror 18 there is a second circumferential aperture which is closed by a second multifaceted lens 30. Multifaceted lens 30 and pyramidal mirror 36 are arranged to have similar optics to lens 16 and pyramidal mirror 18 whereby light from light emitting diode 37 is emitted directly through lens segment 30E for example along a path 38 which is in the same direction as the beam of infrared sensitivity indicated by infrared energy path 22. Likewise, light from light emitting diode 37 is emitted along beam 40 and reflected by pyramidal mirror segment 36E through lens segment 30E and along path 40 which is parallel to infrared sensitivity path 24. Accordingly, the arrangement of lens 30 and pyramidal mirror 36 is such that light emitting diode 37 emits beams of light in a direction which is parallel to and indicative of the directions of infrared sensitivity provided by the upper section of detector 10 which includes a lens 16 and pyramidal mirror 18 operating in connection with detector 14. Accordingly, the lower section of the device provides visual light indicating the direction of infrared sensitivity. Naturally, light emitting diode 37 can be turned off during periods of time following initial installation and alignment of the device so that the location of the beams of infrared sensitivity will not be observable to an intruder.

Lens 16 and lens 30, each having segments designated 16A through 16F and 30A through 30F may be formed out of one or more pieces of infrared transparent plastic material on which there are provided grooves forming a Fresnel lens, as is known in the art. As illustrated in the drawings, the Fresnel lenses of each segment have a optical center, for example, point 20A indicates the center of lens segment 16A and point 32A indicates the center of lens segment 30A. The lens determines the direction of infrared sensitivity and the direction of light emission from the device, as is well known to those familiar with the art.

Figure 5:
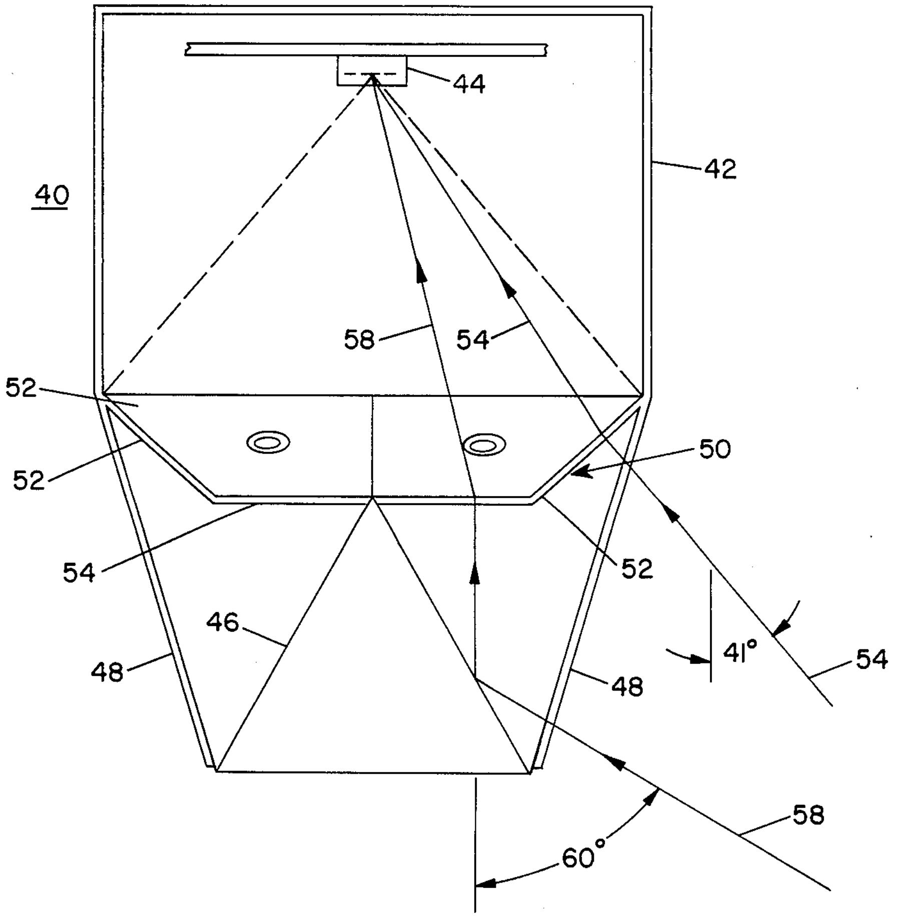
FIG. 5 is a side cross-sectional view showing a further embodiment of the detector wherein the lens segments are shown to lie in the horizontal plane above the apex of a pyramidal mirror.
Figure 6:
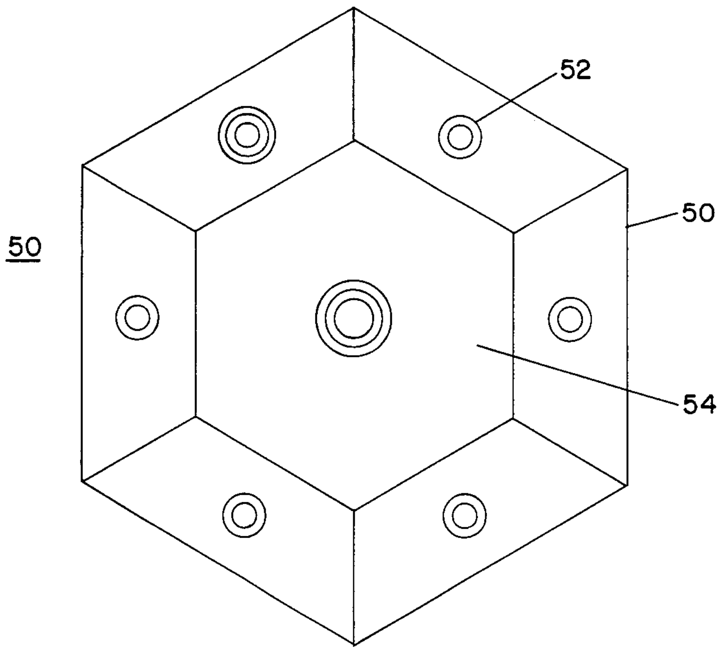
FIG. 6 is a plan view of a lens used in the FIG. 5 detector.

In yet another embodiment shown in FIGS. 5 and 6, the passive infrared intrusion detector 40 includes cylindrical housing 42, the lower end of which is tapered to have a hexagonal shape and meet with a multisided window 48 of infrared translucent plastic, or the like. A multifaceted lens 50 is mounted to lie with its central lens segment 54 in a horizontal plane immediately above the apex of a pyramidal mirror 46. The peripheral lens segments 52 of lens 50 are tilted upward out of the horizontal plan so that infrared energy passes through these lens segments in an approximately normal direction. In this manner, infrared radiation, for example along path 58, passes through the plastic window 48, reflects off the mirror 46 and is focused by lens segment 54 onto sensing element 44. Infrared radiation along path 54 will be focused directly onto the sensing element 44 by lens segment 52 without reflecting off the pyramidal mirror 46.

FIG. 6 shows that lens 50 has seven segments that may be formed out of one or more pieces of infrared transparent plastic material, on which there are provided grooves forming a Fresnel lens. For the detector of FIG. 5 lens 50 has a central segment 54 and six peripheral segments 52. While lens segments 52 are shown in the preferred tilted embodiment, they may be arranged in the same horizontal plan as segment 54.

Those skilled in the art will recognize that passive infrared intrusion detectors often use sensing elements which include dual detectors, which are normally spaced at a spacing of one millimeter. The inventor has determined that while the one millimeter spacing may be appropriate for a wall mounted passive infrared detector, wherein the range from the detector to the intruder is sufficiently large in most instances so that an intruder enters only a single beam upon passing into the region of sensitivity, and wherein motion of an intruder is most likely transverse to the direction of the beam, in the case of a ceiling mounted detector, it is desirable to have a further separation of the dual detector beams provided by each segment of the lenses which form the passive infrared beams of sensitivity. Accordingly, it is found to be appropriate to have a separation of the detector elements, which when viewed from the optical center, for example, 20B, of the focusing lenses has a separation angle, indicated by B in FIG. 3, which is at least approximately ¼ to ⅓ of the separation between the optical centers of adjacent beam forming lenses indicated to be angle A in FIG. 1. Typically, angle B should be 5° or greater, preferably about 7° to 10°. This larger separation of the two detecting elements provides for a larger separation of the dual beams of sensitivity formed by each lens segment.

Those skilled in the art will recognize that the separation between adjacent beam directions, formed by lens segments 16 as indicated in FIG. 1 is rather large, and typically a sensor of the type illustrated would have more than the six lens segments shown in the drawings for convenience of illustration.

While there has been described what is believed to be the preferred embodiment of the present invention, those skilled in the art will recognize that other and further modifications may be made thereto without departing from the spirit of the invention, and is intended to claim all such changes and modifications as fall within the true scope of the invention.

We claim

1. A ceiling mounted passive infrared intrusion detector comprising;

an enclosure mountable on the ceiling;

a downwardly pointing infrared sensing element mounted within said enclosure;

a first multifaceted pyramidal mirror having an apex pointing upwardly toward said sensing element and having a base with a periphery spaced from said enclosure so as to define a first multifaceted aperture; and first lens means for focusing infrared radiation onto the facets of said mirror for reflection directly onto said sensing element.

2. A ceiling mounted passive infrared intrusion detector as specified in claim 1 wherein said first lens means comprises a plurality of lenses mounted in said first multifaceted aperture.

3. A ceiling mounted passive infrared intrusion detector comprising;

an enclosure mountable on the ceiling;

a downwardly pointing infrared sensing element mounted within said enclosure;

a first multifaceted pyramidal mirror having an apex pointing upwardly toward said detecting element and having a base with a periphery spaced from said enclosure so as to define a first multifaceted aperture; and first lens means for focusing infrared radiation reflected by the facets of said mirror onto said sensing element, wherein said first lens means comprises a plurality of lenses mounted in said first multifaceted aperture, and wherein said lenses are further arranged to focus infrared radiation directly onto said sensing element.

4. A ceiling mounted passive infrared intrusion detector comprising;

an enclosure mountable on the ceiling;

a downwardly pointing infrared sensing element mounted within said enclosure;

a first multifaceted pyramidal mirror having an apex pointing upwardly toward said detecting element and having a base with a periphery spaced from said enclosure so as to define a first multifaceted aperture; and first lens means for focusing infrared radiation reflected by the facets of said mirror onto said sensing element, wherein there is provided a downwardly pointing light source within said first pyramidal mirror, and a second multifaceted pyramidal mirror mounted within said first pyramidal mirror and having the same number of reflective surfaces, with similar angular orientation, as said first pyramidal mirror, said second pyramidal mirror having a base with an outer periphery spaced from the base of said first pyramidal mirror so as to form a second multifaceted aperture, and second lens means for focusing light from said light source in a direction parallel to the radiation focused onto said detecting element by said focusing lenses in said first aperture.

5. A ceiling mounted passive infrared detector comprising:

an enclosure mountable on the ceiling;

a downwardly pointing infrared sensing element mounted within said enclosure;

a first multifaceted pyramidal mirror having an apex pointing upwardly toward said detecting element and having a base with a periphery spaced from said enclosure so as to define a first multifaceted aperture; and first lens means for focusing infrared radiation reflected by the facets of said mirror onto said sensing element, wherein said sensing element includes at least two sensing electrodes and wherein the distance between said electrodes is selected so that the angle between centers of said electrodes, as viewed from said lens means, is at least 5°.

6. A ceiling mounted passive infrared intrusion detector comprising:

an enclosure mountable on the ceiling;

a downwardly pointing infrared sensing element mounted within said enclosure;

a first multifaceted pyramidal mirror having an apex pointing upwardly toward said detecting element and having a base with a periphery spaced from said enclosure so as to define a first multifaceted aperture; and first lens means, disposed above the apex of said pyramidal mirror, for focusing infrared radiation onto said sensing element.

7. A ceiling mounted passive infrared intrusion detector as specified in claim 6 wherein said lens includes a central horizontal lens segment and a plurality of peripheral lens segments tilted with respect to said central segment.

* * * * *

UNITED STATES PATENT AND TRADEMARK OFFICE

CERTIFICATE OF CORRECTION

PATENT NO. : 4,778,996

DATED : October 18, 1988

INVENTOR(S) : Baldwin et al.

It is certified that error appears in the above-identified patent and that said Letters Patent is hereby corrected as shown below:

Col. 1, line 47, "other" should read --others--;

Col. 2, line 12, "multifaced" should read --multifaceted--;

Col. 2, bridging lines 65-66, "multifaced" should read --multifaceted--;

Col. 3, line 12, "multifaced" should read --multifaceted--; and

Col. 4, line 18, after "lens" insert --center--.

Signed and Sealed this

Twenty-first Day of March, 1989

*Attest:*

DONALD J. QUIGG

*Attesting Officer*

*Commissioner of Patents and Trademarks*